(12) United States Patent
Valverde Pereira

(10) Patent No.: US 10,550,879 B2
(45) Date of Patent: Feb. 4, 2020

(54) THRUST WASHER

(71) Applicants: Mahle Metal Leve S/A, Jundiai (BR); Mahle International GmbH, Stuttgart (DE)

(72) Inventor: Marcos Manoel Valverde Pereira, Sao Paulo (BR)

(73) Assignees: Mahle Metal Leve S/A (BR); Mahle International GmbH (DE)

( * ) Notice: Subject to any disclaimer, the term of this patent is extended or adjusted under 35 U.S.C. 154(b) by 178 days.

(21) Appl. No.: 15/557,465

(22) PCT Filed: Mar. 3, 2016

(86) PCT No.: PCT/EP2016/054571
§ 371 (c)(1),
(2) Date: Sep. 11, 2017

(87) PCT Pub. No.: WO2016/146401
PCT Pub. Date: Sep. 22, 2016

(65) Prior Publication Data
US 2018/0066698 A1  Mar. 8, 2018

(30) Foreign Application Priority Data
Mar. 13, 2015  (BR) .............................. 102015005671

(51) Int. Cl.
*F16C 17/04* (2006.01)
*F16C 9/02* (2006.01)
(Continued)

(52) U.S. Cl.
CPC .............. *F16C 9/02* (2013.01); *F16C 17/047* (2013.01); *F16C 33/107* (2013.01); *F16C 33/124* (2013.01)

(58) Field of Classification Search
CPC .. F16C 9/02; F16C 9/04; F16C 17/047; F16C 17/107; F16C 33/1065; F16C 33/1075; F16C 2360/22
See application file for complete search history.

(56) References Cited

U.S. PATENT DOCUMENTS 5,192,136 A    3/1993  Thompson et al.
5,520,466 A *  5/1996  Everitt ..................... F16C 17/10
                                                            384/124
(Continued)

FOREIGN PATENT DOCUMENTS

DE    3901265 A1 *  7/1990  ................. F16C 9/02
EP    1870607 A1   12/2007
(Continued)

OTHER PUBLICATIONS

Japanese Office Action dated Oct. 23, 2019 for related to corresponding Japanese Patent Application No. 2017-544762.

*Primary Examiner* — Phillip A Johnson
(74) *Attorney, Agent, or Firm* — Fishman Stewart PLLC

(57) ABSTRACT

A thrust washer for an internal combustion engine may include a metal base having a contact surface and a slip surface. The contact surface may be in operative communication with an engine block. The slip surface may define at least one ramp section, at least one flat horizontal section, and at least one oil channel. The ramp section and the flat horizontal section may be connected via an asymptotic curved surface. The ramp section may be positioned asymptotically towards the flat horizontal section.

20 Claims, 2 Drawing Sheets

(51) Int. Cl.
*F16C 33/10* (2006.01)
*F16C 33/12* (2006.01)

(56) References Cited

U.S. PATENT DOCUMENTS

| | | | | |
|---|---|---|---|---|
| 6,120,188 | A | 9/2000 | Fujinaka et al. | |
| 6,921,210 | B2* | 7/2005 | Welch | F16C 9/02 |
| | | | | 384/123 |
| 6,976,788 | B2* | 12/2005 | Honda | F16C 33/1065 |
| | | | | 384/123 |
| 7,134,793 | B2* | 11/2006 | Thompson | F16C 9/02 |
| | | | | 384/294 |
| 7,354,199 | B2* | 4/2008 | Welch | F16C 9/00 |
| | | | | 384/275 |
| 9,746,023 | B2* | 8/2017 | George | F16C 9/02 |
| 2002/0094143 | A1* | 7/2002 | Yang | F16C 9/02 |
| | | | | 384/294 |
| 2015/0323001 | A1* | 11/2015 | Carter | F16C 9/02 |
| | | | | 384/291 |

FOREIGN PATENT DOCUMENTS

| | | |
|---|---|---|
| FR | 650137 A | 1/1929 |
| FR | 889396 A | 1/1944 |
| JP | S63-158620 U | 10/1988 |
| JP | 2004-293684 A | 10/2004 |
| WO | WO-02/20999 A2 | 3/2002 |

\* cited by examiner

THRUST WASHER

CROSS-REFERENCE TO RELATED APPLICATIONS

This application claims priority to International Patent Application No.: PCT/EP2016/054571 filed on Mar. 3, 2016, and Brazilian Patent Application No.: BR 10 2015 005671 0 filed on Mar. 13, 2015, the contents of each of which are incorporated herein by reference.

TECHNICAL FIELD

This invention relates to a thrust washer for internal combustion engines provided with a metal base comprising at least one slip surface having a uniform surface profile without any points of inflection or high points.

BACKGROUND

Internal combustion engines are energy conversion mechanisms used by the great majority of motor vehicles and basically comprise two main parts-one or more cylinder heads and the engine block. Below the cylinder head(s) are located the combustion chambers and the cylinders and the crankshaft assembly is located in the engine block.

The crankshaft is a fundamental component in the functioning of combustion engines, and is responsible for converting the energy generated by combustion of the air/fuel mixture into torque. The crankshaft, which is mounted in the block by supporting bearings, is usually of cast carbon steel and has connecting rods coupled to the crank pins and their geometry is reminiscent of a number of cranks placed side by side.

Among the components which help to mount the crankshaft in the engine block are bushes and thrust washers, the thrust washers being responsible for withstanding the axial loads generated by the gearing or gearshift system.

Thrust washers are generally located in one or more bearing positions, and basically comprise two half-moons or two half-washers positioned at the top and bottom of the bearing. These washers act in such a way as to cancel out possible axial forces acting on the crankshaft, so that when it is exposed to an axial load the force generated does not act directly on the engine block because the washer provides a supporting surface for the load, preventing wear on the block.

As may be seen in FIG. 1, a thrust washer is provided with a metal base, substantially of a semi-circumferential shape, and has two surfaces. The contact surface is associated with the engine block, and there is no relative movement between the washer and the block, while the slip surface remains in contact with the crankshaft, giving rise to relative movement between the washer and the crankshaft. Depending upon the applied load, the relative movement places a high load on the contact between the slip surface and the crankshaft, the slip surface being responsible for supporting the axial load produced. In addition to this, thrust washers also have an internal diameter, associated with the shaft, and channels for oil.

The oil channels are fundamental to the proper functioning of thrust washers and ensure that surfaces are lubricated, preventing accelerated/excessive wear on the bearings. These channels are filled with oil so that the oil is distributed over the surface through the pull generated by the rotational movement.

Both Otto and Diesel engines are subject to axial loads. Furthermore, these loads are even greater mainly in engines provided with automatic or automated gear changes. These gears help to reduce fuel consumption in motor vehicles, but they increase the applied loads, with the result that the thrust washers currently in use cannot withstand the forces and become worn or suffer other deficiencies.

In order for the washer to support the loads generated an oil film has to be formed between the slip surface of the washer and the crankshaft. This oil film must maintain a thickness, and it is created through a phenomenon known as hydrodynamic support. This hydrodynamic support depends on two factors—the shape of the surface and the speed.

A washer is said to be hydrodynamically supported when there is no metal-to-metal contact, that is when there is a distance between the surfaces, this distance being the thickness of the oil film. For hydrodynamic support to occur the thickness of the oil film must be three times greater than the surface roughness.

In order to achieve sufficient hydrodynamic support a specific rotation speed, and the best surface possible for that condition, have to be guaranteed. As the rotation speed varies in relation to the speed of the vehicle, the surface can be modified in such a way as to achieve sufficient support to support high axial loads and forces.

In the state of the art there are flat washers, convex washers and ramp-and-pad washers, which basically comprise at least one ramp section, at least one flat horizontal section and at least one channel.

Washers having a flat slip surface, as the name suggests, do not have any geometry on the slip surface, and only include oil channels. These washers have low resistance to wear and are only suitable for engines with low loads.

Convex washers are manufactured by a stamping process and comprise a curvilinear slip surface. They are cheaper, but they have low resistance to wear because of the great variation in the geometry of the slip surface, and because of the lack of flat sections. It should be noted that a flat section is essential in order to maintain hydrodynamic support.

Furthermore ramp-and-pad washers are produced by a machining process and comprise at least one ramp with a constant inclination, at least one horizontal flat surface and at least one oil channel. These washers ensure a high level of hydrodynamic support because the machining process guarantees that the washer is dimensionally stable, and the flat horizontal section ensures a high level of hydrodynamic support, improving the performance of the washers.

Although ramp-and-pad washers have greater resistance to wear and better performance, the connection between the ramp section and the horizontal section represents a sudden change in geometry. Mathematically speaking, this point of connection gives rise to an inflection point or vertex which interrupts the distribution of oil on the slip surface, reducing hydrodynamic support at that point. This inflection point or vertex results in a change in pressure behaviour, giving rise to instability.

One way of reducing this shortcoming is to round off the said vertex linking the ramp section to the flat horizontal section by means of a small radius. This configuration results in less instability in the washer, but it does not ensure excellent performance.

In view of the above, there has not yet been developed any thrust washer which has a surface which guarantees uniform hydrodynamic support which is not affected by any transition effect, imparting high wear resistance to the washer and consequently excellent performance.

SUMMARY

The object of this invention is to provide a thrust washer, a washer comprising a base provided with one slip surface, a slip surface comprising at least one ramp section, at least one flat horizontal section, at least one oil channel, and a connection between the ramp section and the horizontal section which is without points of inflection or vertices.

Another object of this invention is to provide a thrust washer which ensures uniform hydrodynamic support without any transition between the surfaces.

A further object of this invention is to provide a thrust washer having high resistance to wear, and as a consequence excellent performance, especially in engines with high loads.

Yet a further object of this invention is to provide a thrust washer which has a dimensionally stable surface on the slip surface and an oil film thickness which is greater than three times the surface roughness of the slip surface.

The objects of this invention are accomplished by a thrust washer for internal combustion engines provided with a metal base comprising a contact surface associated with the engine block and a slip surface, the slip surface comprising a surface profile incorporating at least one ramp section, at least one flat horizontal section, and at least one oil channel, the ramp section and the flat horizontal section being connected through at least one asymptotic curve, the ramp section tending towards the flat horizontal surface asymptotically.

The objects of this invention are also accomplished through an internal combustion engine comprising at least one thrust washer as described above.

BRIEF DESCRIPTION OF THE DRAWINGS

This invention will be described more particularly below on the basis of an embodiment illustrated in the drawings. The drawings show.

DETAILED DESCRIPTION OF THE DRAWINGS

This invention relates to a thrust washer 1 for internal combustion engines provided with a metal base comprising at least one slip surface 3 having a uniform surface profile without points of inflection or vertices.

As already mentioned in the state of the art, thrust washers 1 are components which help mount the crankshaft in the block of an internal combustion engine, and are responsible for withstanding the axial loads generated by the gearing or gear change system.

Figure 1:
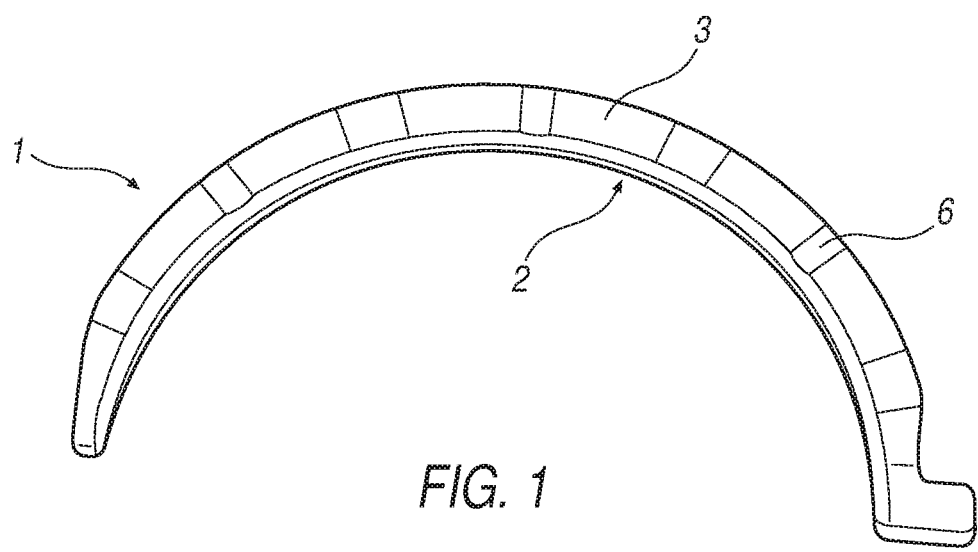
FIG. 1-a perspective view of a thrust washer together with all its constituent parts.

As may be seen in FIG. 1, thrust washer 1 is provided with a metal base, substantially of semi-circumferential shape, and comprises two surfaces. Contact surface 2 is associated with the engine block, and there is no relative movement between washer 1 and the block, while slip surface 3 remains in contact with the crankshaft, generating a relative movement between washer 1 and the crankshaft. Depending upon the applied load, the relative movement places a high load on the contact between slip surface 3 and the crankshaft, while slip surface 3 is responsible for supporting the axial load generated. In addition to this, thrust washer 1 also comprises a diameter for association with the bearing, and at least one oil channel 6.

In order for washer 1 to support the loads generated an oil film must be formed between slip surface 3 of washer 1 and the crankshaft. This oil film must maintain a thickness and is produced by means of a phenomenon known as hydrodynamic support. This hydrodynamic support depends on two factors—the shape of the surface and the rotation speed of the crankshaft.

Washer 1 is said to maintain hydrodynamic support when there is no metal-to-metal contact, that is there is a distance between the surfaces, this distance being the thickness of the oil film.

In order to have sufficient hydrodynamic support, a specific rotation speed has to be ensured, and the best surface possible for this condition also has to be guaranteed. As the rotation speed varies according to the speed of the vehicle, the surface of the slip surface has to be altered so as to achieve sufficient support to support high loads and axial forces.

Figure 2:
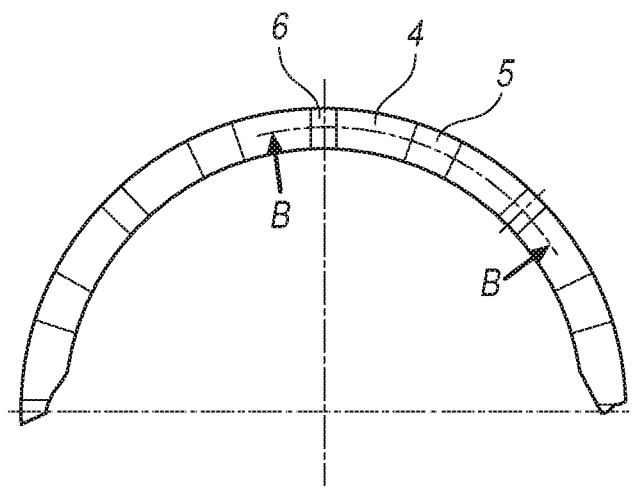
FIG. 2-a front view of the thrust washer according to this invention.
Figure 3:
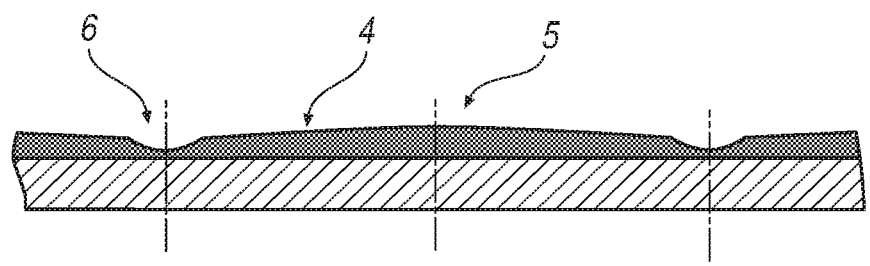
FIG. 3-a detailed view of a cross-section B-B in FIG. 2.

In this respect this invention provides a preferred configuration for thrust washer 1 in FIGS. 2 and 3, comprising a surface profile of slip surface 3 incorporating at least one ramp section 4, at least one flat horizontal section 5 and at least one oil channel 6, ramp section 4 and flat horizontal section 5 being connected by means of an asymptotic curve.

Ramp section 4 starts with the inclination of the curve and tends asymptotically towards flat horizontal section 5. This means that ramp section 4 and flat horizontal section 5 are connected through a constant curve which is smoothly concordant, eliminating possible points of inflection or vertices in the connection.

As explained previously in the state of the art, the presence of points of inflection or vertices in the connection between ramp section 4 and flat horizontal section 5 results in a change in the behaviour of the oil pressure, giving rise to instability in the hydrodynamic support of washer 1.

Thus this invention provides a thrust washer 1 which ensures more uniform hydrodynamic support, cancelling out the transitional effects produced by points of inflection or vertices.

This more uniform hydrodynamic support means that there is no metal-to-metal contact between slip surface 3 and the crankshaft, ensuring a distance between the surfaces or an oil film thickness at least three times the surface roughness.

Furthermore washer 1 according to this invention is less influenced by the dimensional tolerance of the surface. The tolerance in the angle of the straight ramp represented in the state of the art affects the result of hydrodynamic support and load support. Change in the tolerance in washer 1 according to this invention has less effect on these properties.

Figure 4:
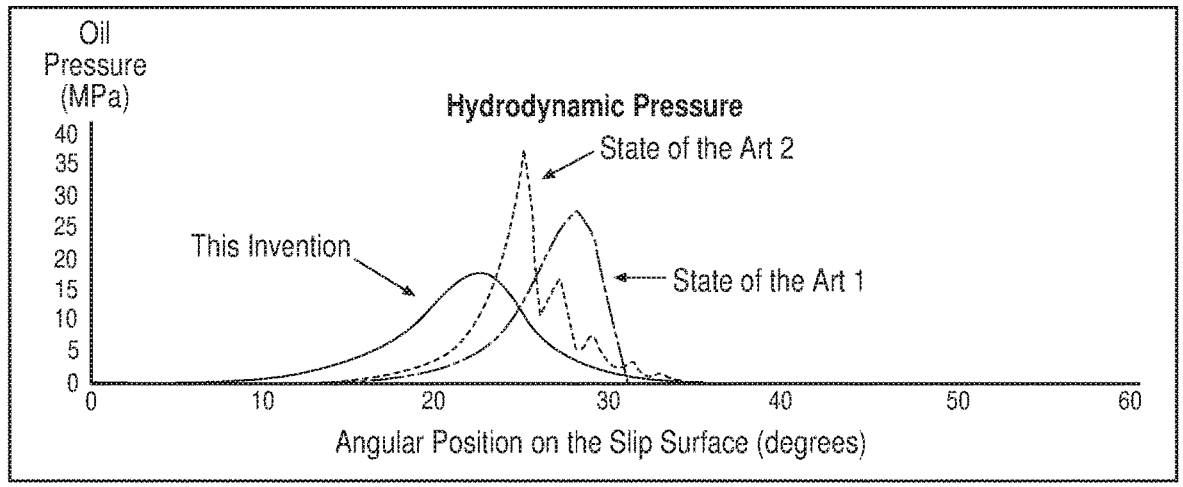
FIG. 4-a comparative graph of the hydrodynamic pressure generated by thrust washers according to the state of the art and according to this invention.

Viewing FIG. 4, the influence of the surface profile of slip surface 3 in relation to the angular position of that surface 3 in connection with the oil pressure maintained on that surface can be seen. In addition to this FIG. 5 shows the profile of slip surface 3 produced in accordance with the angular position of surface 3.

State of the art 1 shows a surface profile for a convex washer, while state of the art 2 shows the surface profile for a ramp-and-pad washer provided with a straight ramp.

Figure 5:
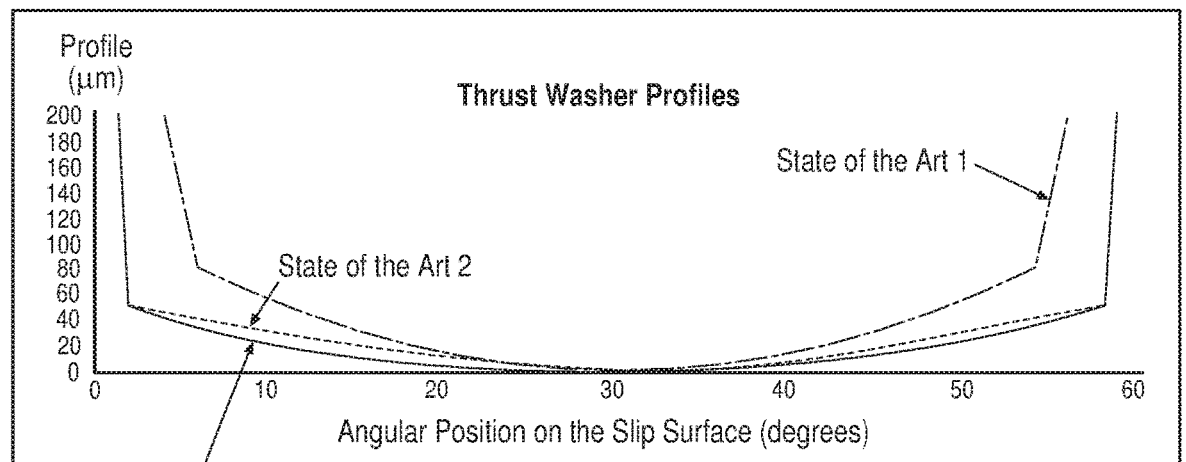
FIG. 5-a comparative graph of the hydrodynamic pressure generated by thrust washers according to the state of the art and according to this invention.

Examining FIGS. 4 and 5, it will be concluded that the surface profile of slip surface 3 provided by this invention gives rise to a smaller oil pressure, but with greater hydrodynamic support and a thicker oil film.

In view of the above, thrust washer 1 according to this invention offers an increase in the maximum supported load, increased wear resistance and, as a consequence, excellent performance.

Although a preferred embodiment has been described, it should be understood that the scope of this invention covers other possible variations, being limited only by the content of the appended claims, including possible equivalents therein.

The invention claimed is:

1. A thrust washer for an internal combustion engine comprising:
   a metal base having a contact surface and a slip surface, the contact surface in operative communication with an engine block, and the slip surface defining at least one ramp section, at least one flat horizontal section, and at least one oil channel; and
   wherein the at least one ramp section extends asymptotically towards the at least one flat horizontal section and is connected thereto such that a transition between the at least one ramp section and the at least one flat horizontal section defines an asymptotic curved surface.

2. The trust washer of claim 1, wherein the contact surface defines a uniform flat profile without interruption.

3. The thrust washer of claim 1, wherein the metal base has a semi-circumferential shape.

4. The thrust washer of claim 1, wherein the metal base has an inner circumferential surface and an outer circumferential surface interposed between the contact surface and the slip surface.

5. The thrust washer of claim 1, wherein the slip surface has a uniform surface profile free of points of inflection and vertices in the transition between the at least one ramp section and the at least one flat horizontal section.

6. The thrust washer of claim 1, wherein the asymptotic curved surface defines a constant curve that is smoothly concordant connecting the at least one ramp section to the at least one flat horizontal section.

7. The thrust washer of claim 1, wherein the at least one ramp section extends between the at least one oil channel and the at least one flat horizontal section, and wherein the at least one ramp section defines the asymptotic curved surface where the at least one ramp section starts at the at least one oil channel with an inclination of an asymptotic curve and continues asymptotically towards the at least one flat horizontal section.

8. An internal combustion engine comprising:
   at least one thrust washer including a metal base having a contact surface and a slip surface, the contact surface in operative communication with an engine block, and the slip surface defining at least one ramp section, at least one flat horizontal section, and at least one oil channel;
   wherein the at least one ramp section extends asymptotically towards the at least one flat horizontal section and is connected thereto via an asymptotic curved surface, and wherein the asymptotic curved surface defines a constant curve between the at least one ramp section and the at least one flat horizontal section.

9. The internal combustion engine of claim 8, wherein the constant curve of the asymptotic curved surface is smoothly concordant without points of inflection and vertices.

10. The internal combustion engine of claim 9, wherein the contact surface has a uniform flat profile without interruption.

11. The internal combustion engine of claim 8, wherein the at least one ramp section extends between the at least one oil channel and the at least one flat horizontal section, and wherein the at least one ramp section defines the asymptotic curved surface where the at least one ramp section starts at the at least one oil channel with an inclination of an asymptotic curve and continues asymptotically towards the at least one flat horizontal section.

12. A thrust washer for an internal combustion engine comprising:
   a semi-circumferential shaped base having a contact surface, a slip surface opposite of the contact surface, an inner circumferential surface, and an outer circumferential surface; and
   wherein the slip surface defines a uniform surface profile including at least one ramp section and at least one flat section connected via a transition surface having an asymptotic curved profile.

13. The thrust washer as set forth in claim 12, wherein the slip surface further includes at least one oil channel.

14. The thrust washer of claim 13, wherein the at least one ramp section is disposed between the at least one oil channel and the at least one flat horizontal section, and wherein the at least one ramp section extends asymptotically from the at least one oil channel towards the at least one flat horizontal section.

15. The thrust washer as set forth in claim 12, wherein the base is composed of a metal.

16. The thrust washer of claim 12, wherein the asymptotic curved profile of the transition surface defines a constant curve that is smoothly concordant without points of inflection and vertices.

17. An internal combustion engine comprising:
   a cylinder block;
   at least one cylinder positioned within the cylinder block;
   at least one cylinder head positioned above the at least one cylinder;
   a crankshaft in operative communication with the at least one cylinder, wherein the crankshaft is mounted in the cylinder block via at least one bearing;
   a first thrust washer arranged adjacent to an upper portion of the at least one bearing and a second thrust washer arranged adjacent to a lower portion of the at least one bearing;
   the first thrust washer and the second thrust washer each including a semi-circumferential shaped base having a contact surface lying against the cylinder block, a slip surface opposite of the contact surface, an inner circumferential surface, and an outer circumferential surface;
   the slip surface having a uniform surface profile; and
   wherein the slip surface includes at least one oil channel, at least one flat horizontal section, and at least one ramp section extending between the at least one oil channel and the at least one flat horizontal section defining an asymptotic curved profile, and is in indirect contact with an axial facing surface of the crankshaft.

18. The internal combustion engine of claim 17, wherein a distance between the slip surface and the axial facing surface of the crankshaft is at least three times greater than a surface roughness of the slip surface.

19. The internal combustion engine of claim 17, wherein the asymptotic curved profile of the at least one ramp section defines a constant curve that is smoothly concordant without points of inflection and vertices.

20. The internal combustion engine of claim 19, wherein the contact surface has a uniform flat profile without interruption.

* * * * *